(12) United States Patent
Ueda

(10) Patent No.: US 10,502,615 B2
(45) Date of Patent: Dec. 10, 2019

(54) DIAGNOSTIC APPARATUS AND DIAGNOSTIC SYSTEM

(71) Applicant: Mitsubishi Electric Corporation, Chiyoda-ku (JP)

(72) Inventor: Koichiro Ueda, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/304,331

(22) PCT Filed: May 24, 2017

(86) PCT No.: PCT/JP2017/019419
§ 371 (c)(1),
(2) Date: Nov. 26, 2018

(87) PCT Pub. No.: WO2018/012123
PCT Pub. Date: Jan. 18, 2018

(65) Prior Publication Data
US 2019/0137328 A1 May 9, 2019

(30) Foreign Application Priority Data
Jul. 12, 2016 (JP) .................................. 2016-137548

(51) Int. Cl.
*G01H 9/00* (2006.01)
*G05B 23/02* (2006.01)
*G06F 3/0482* (2013.01)

(52) U.S. Cl.
CPC ......... *G01H 9/002* (2013.01); *G05B 23/0272* (2013.01); *G05B 23/0275* (2013.01); *G06F 3/0482* (2013.01)

(58) Field of Classification Search
CPC ................ G01H 9/002; G05B 23/0272; G05B 23/0275; G06F 3/0482
(Continued)

(56) References Cited

U.S. PATENT DOCUMENTS

| | | | |
|---|---|---|---|
| 9,983,776 B1* | 5/2018 | Wu | ...................... G06F 3/04847 |
| 2017/0169575 A1* | 6/2017 | Perez Acal | .............. G01H 9/00 |
| 2017/0277166 A1* | 9/2017 | Popa-Simil | ........ G05B 19/4069 |

FOREIGN PATENT DOCUMENTS

JP    11-278041 A    10/1999

OTHER PUBLICATIONS

International Search Report dated Jul. 11, 2017, in PCT/JP2017/019419, filed May 24, 2017.

* cited by examiner

*Primary Examiner* — Max H Noori
(74) *Attorney, Agent, or Firm* — Oblon, McClelland, Maier & Neustadt, L.L.P.

(57) ABSTRACT

A diagnostic apparatus includes: a storage unit that stores information on a vibration phenomenon in association with a video of a vibration phenomenon for each of kinds of vibration phenomena that can occur in a machine; a video display unit that displays the video of a vibration phenomenon of each of the kinds of vibration phenomena, the video being read by a video reading unit; a phenomenon selection unit that receives a selection result indicating the video of a vibration phenomenon selected by a user from the video of each of the plurality of kinds of vibration phenomena; a diagnosis unit that reads, from the storage unit, the information on a vibration phenomenon stored in association with the video corresponding to the selection result, and outputs the information on a vibration phenomenon that is read as a diagnostic result; and a diagnostic result display unit that displays the diagnostic result.

10 Claims, 11 Drawing Sheets

(58) Field of Classification Search
 USPC .................................................. 73/862.59
 See application file for complete search history.

FIG.6

| | VIDEO | NAME OF PHENOMENON | CAUSE | MEASURE |
|---|---|---|---|---|
| 1 | FIRST VIDEO | OSCILLATION | UNSTABLE FEEDBACK LOOP | READJUSTMENT OF GAIN OR FILTER IN FEEDBACK LOOP |
| 2 | SECOND VIDEO | RESIDUAL VIBRATION | LOW MECHANICAL RIGIDITY | USE OF NOTCH FILTER FOR REMOVING FREQUENCY OF RESIDUAL VIBRATION |
| 3 | THIRD VIDEO | MECHANICAL SHOCK VIBRATION | REDUCED ACCELERATION TIME OR DECELERATION TIME | READJUSTMENT OF ACCELERATION TIME OR DECELERATION TIME |
| ⋮ | ⋮ | ⋮ | ⋮ | ⋮ |

FIG.7

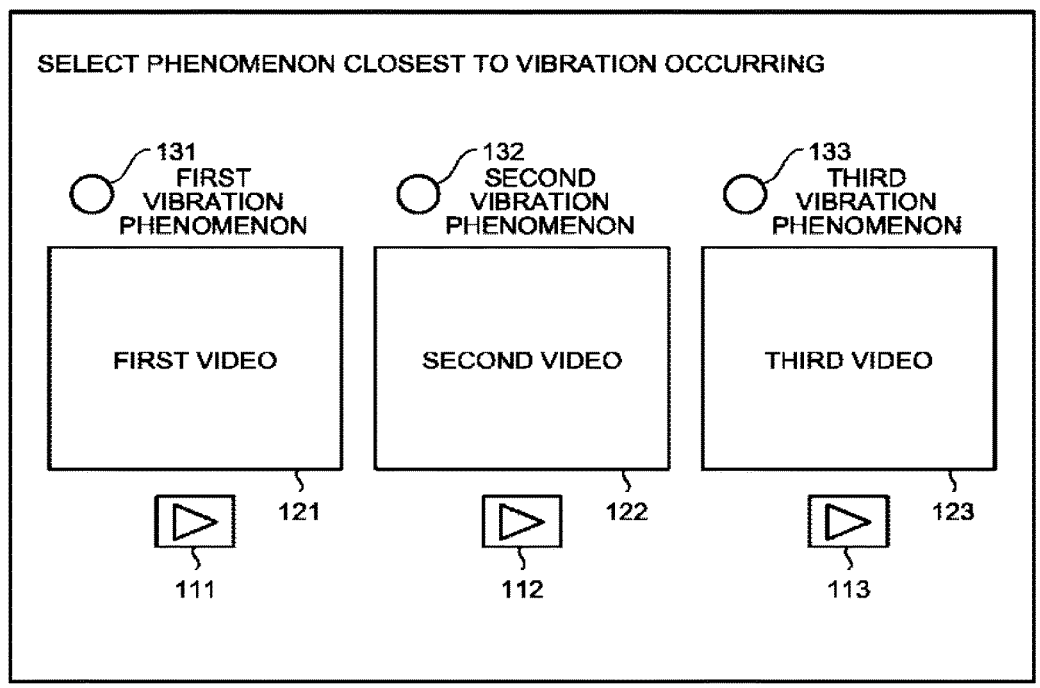

FIG.11

| | MECHANI-CAL PART | VIDEO | NAME OF PHENOME-NON | CAUSE | PROPOSED MEASURE |
|---|---|---|---|---|---|
| 1 | BALL SCREW | FIRST VIDEO | OSCILLA-TION | UNSTABLE FEEDBACK LOOP | READJUSTMENT OF GAIN OR FILTER IN FEEDBACK LOOP |
| 2 | BALL SCREW | SECOND VIDEO | RESIDUAL VIBRATION | LOW MECHANICAL RIGIDITY | USE OF NOTCH FILTER FOR REMOVING FREQUENCY OF RESIDUAL VIBRATION |
| 3 | BALL SCREW | THIRD VIDEO | MECHANI-CAL SHOCK VIBRATION | REDUCED ACCELERATION TIME OR DECELERATION TIME | READJUSTMENT OF ACCELERATION TIME OR DECELERATION TIME |
| 4 | TIMING BELT | FOURTH VIDEO | OSCILLA-TION | UNSTABLE FEEDBACK LOOP | READJUSTMENT OF GAIN OR FILTER IN FEEDBACK LOOP |
| 5 | TIMING BELT | FIFTH VIDEO | MECHANI-CAL SHOCK VIBRATION | REDUCED ACCELERATION TIME OR DECELERATION TIME | READJUSTMENT OF ACCELERATION TIME OR DECELERATION TIME |
| 6 | TIMING BELT | SIXTH VIDEO | SYNCHRO-NOUS VIBRATION | COLLISION BETWEEN TEETH | USE OF DISTURBANCE SUPPRESSION CONTROL |
| 7 | RACK AND PINION | SEVENTH VIDEO | ⋮ | ⋮ | ⋮ |
| ⋮ | ⋮ | ⋮ | ⋮ | ⋮ | ⋮ |

DIAGNOSTIC APPARATUS AND DIAGNOSTIC SYSTEM

FIELD

The present invention relates to a diagnostic apparatus and a diagnostic system for diagnosing a vibration phenomenon when the vibration phenomenon occurs in a machine that uses a motor as a drive source.

BACKGROUND

Many motors such as servo motors serving as a drive source for industrial machines (hereinafter simply referred to as "machines") are used in the machines. A user who designs a machine selects a motor suitable for the machine according to operating specifications of the machine. The user then mounts the selected motor to the machine, makes adjustments, and performs start up of the machine. At the time of start up, however, a vibration phenomenon may occur in the machine.

The vibration phenomenon that occurs in the machine occurs due to the machine or a motor controller such as an amplifier that controls the motor. Vibration phenomena are diverse and cannot be suppressed unless a user takes measures corresponding to the vibration phenomena. When a user misdiagnoses a vibration phenomenon occurring and takes wrong measures, he may not only fail to suppress the vibration phenomenon but exacerbate the vibration phenomenon.

A user with abundant knowledge and experience on machines, motors, and motor controllers can diagnose the vibration phenomenon on site and take correct measures corresponding to the vibration phenomenon. On the other hand, a user with less knowledge and experience on machines, motors, and motor controllers cannot diagnose the vibration phenomenon on site. Thus, the user calls an expert with abundant knowledge and experience on machines, motors, and motor controllers to the scene, for example, and takes measures after the expert makes a diagnosis, thereby requiring time to suppress the vibration phenomenon.

As a technique for determining the type of vibration phenomenon, Patent Literature 1 discloses a technique that acquires vibration waveform data using a vibration sensor, calculates each feature value of the data acquired, and determines the type of vibration phenomenon from the feature value calculated.

CITATION LIST

Patent Literature

Patent Literature 1: Japanese Patent Application Laid-open No. H11-278041

SUMMARY

Technical Problem

The technique described in Patent Literature 1 may be able to diagnose the vibration phenomenon in a case where a machine to which a motor is mounted has a specific structure. In general, however, a machine does not necessarily have a specific structure so that the technique described in Patent Literature 1 fails to accurately diagnose a vibration phenomenon of a machine. A machine is typically constructed using various kinds of mechanical parts and thus does not have a specific structure. Moreover, since the mechanical parts perform various operations using a motor as a drive source, it is difficult for a user to accurately diagnose a vibration phenomenon of the machine from the vibration waveform data alone.

The present invention has been made in view of the above, and an object of the invention is to obtain a diagnostic apparatus that can accurately diagnose a vibration phenomenon when the vibration phenomenon occurs in a machine using a motor as a drive source.

Solution to Problem

According to an aspect of the present invention, a diagnostic apparatus for diagnosing a vibration phenomenon occurring in a machine that uses a motor as a drive source includes a storage unit that stores information on a vibration phenomenon in association with a video of a vibration phenomenon for each of a plurality of kinds of vibration phenomena that can occur in the machine. The diagnostic apparatus includes a video reading unit that reads the video of each of the plurality of kinds of vibration phenomena from the storage unit. The diagnostic apparatus includes a video display unit that displays the video of each of the plurality of kinds of vibration phenomena read by the video reading unit. The diagnostic apparatus includes a phenomenon selection unit that receives a selection result indicating a video selected by a user from the video of each of the plurality of kinds of vibration phenomena. The diagnostic apparatus includes a diagnosis unit that reads, from the storage unit, the information on a vibration phenomenon stored in association with the video corresponding to the selection result, and outputs the information on a vibration phenomenon that is read as a diagnostic result. The diagnostic apparatus includes a diagnostic result display unit that displays the diagnostic result.

Advantageous Effects of Invention

The present invention can accurately diagnose a vibration phenomenon when the vibration phenomenon occurs in a machine using a motor as a drive source.

BRIEF DESCRIPTION OF DRAWINGS

FIG. 6 is a table for explaining an example of information stored in association with each other in a storage unit of the diagnostic apparatus in FIG. 1.

FIG. 7 is a diagram for explaining an example of a video display unit and a phenomenon selection unit of the diagnostic apparatus in FIG. 1.

FIG. 11 is a table for explaining an example of information stored in association with each other in a storage unit of the diagnostic apparatus in FIG. 8.

DESCRIPTION OF EMBODIMENTS

A diagnostic apparatus and a diagnostic system according to embodiments of the present invention will now be described in detail with reference to the drawings. Note that the present invention is not limited to the embodiments.

First Embodiment

Figure 1:
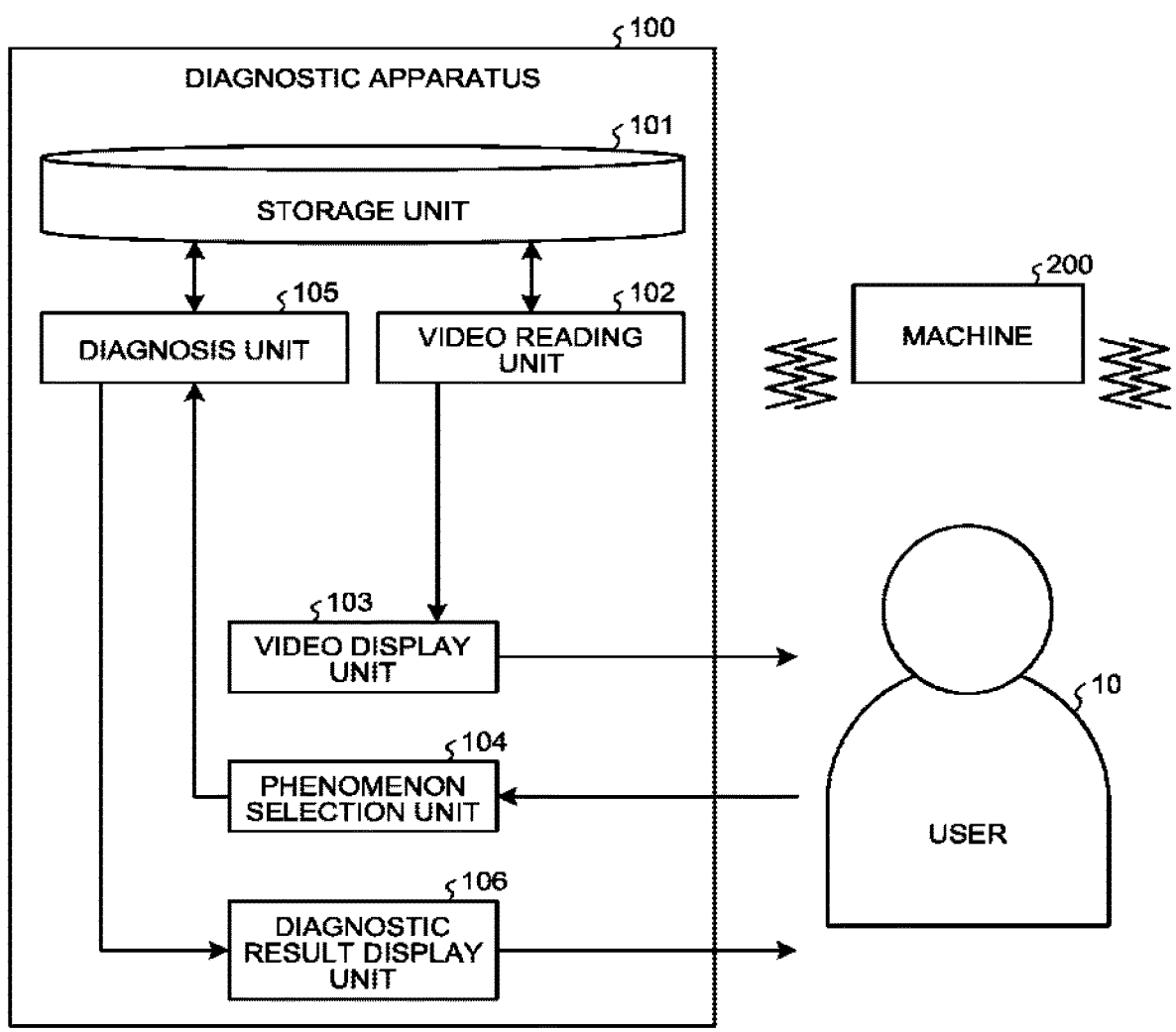
FIG. 1 is a diagram illustrating an example of a functional configuration of a diagnostic apparatus according to a first embodiment of the present invention.

First, a diagnostic apparatus according to a first embodiment of the present invention will be described. FIG. 1 is a diagram illustrating an example of a functional configuration of a diagnostic apparatus according to the first embodiment of the present invention. A diagnostic apparatus 100 in FIG. 1 is an apparatus that diagnoses a vibration phenomenon when the vibration phenomenon occurs in a machine 200. The machine 200 is an industrial machine such as a manufacturing machine or a processing machine. A user 10 performs work such as start up work or adjustment work on the machine 200. When a vibration phenomenon occurs in the machine 200, the user 10 uses the diagnostic apparatus 100 to grasp the vibration phenomenon occurring in the machine 200 and takes measures corresponding to the vibration phenomenon on the machine 200.

Figure 2:
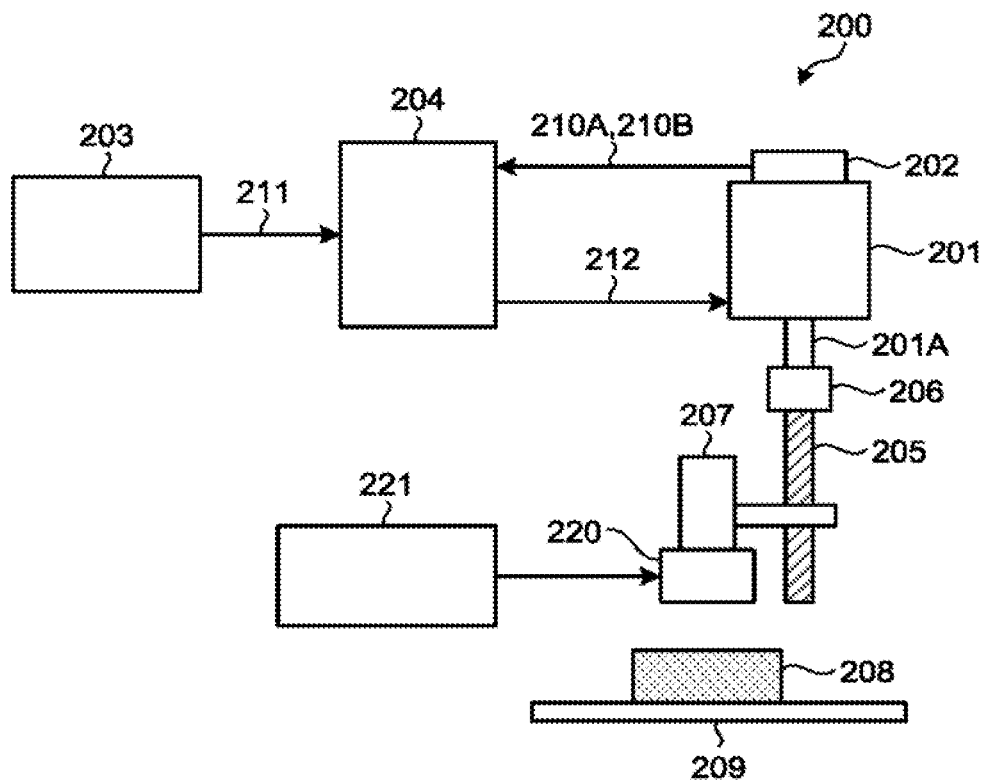
FIG. 2 is a diagram schematically illustrating an example of a machine in FIG. 1.

First, the machine 200 in FIG. 1 will be described. FIG. 2 is a diagram schematically illustrating an example of the machine 200 in FIG. 1. The machine 200 in FIG. 2 includes a ball screw 205 which is a mechanical part, a machining head 207 which is a mechanical load, and a heater 220. The machine 200 uses the ball screw 205 to transmit driving force of a motor 201 to the machining head 207 via the ball screw 205 and presses a workpiece 208 placed on a table 209. The machine 200 may be any machine as long as the machine uses the motor 201 as a drive source.

The motor 201 is driven by a current 212 supplied from a motor controller 204 and serves as the drive source to operate the machining head 207. The motor 201 is a servo motor, for example. The machining head 207 is driven by the motor 201. The workpiece 208 is an object to be pressed that is placed on the table 209 and machined by the machining head 207 that comes into contact with the object and presses the object.

An encoder 202 attached to the motor 201 detects rotational position and speed of the motor 201 to output the rotational position detected as a position feedback signal 210A and the rotational speed detected as a speed feedback signal 210B. The ball screw 205 for converting rotational motion of the motor 201 into translational motion is provided to a rotary shaft 201A of the motor 201. The motor 201 and the ball screw 205 are coupled by a coupling 206. The machining head 207 is joined to the ball screw 205. The machining head 207 moves downward in the drawing and comes into contact with the workpiece 208 to achieve pressing of the workpiece 208.

A command generator 203 generates an operation pattern signal 211 indicating an operation pattern of the motor 201 and outputs the signal to the motor controller 204 that drives the motor 201. The operation pattern signal 211 includes a position command value or a speed command value. The position command value is information indicating the position of the machining head 207 as a movable part at a given time. The speed command value is information indicating the travel speed of the machining head 207 at a given time. The command generator 203 is a motion controller, a programmable logic controller (PLC), or a positioning unit accompanying a PLC.

The motor controller 204 supplies the current 212 to the motor 201 such that the position feedback signal 210A and the speed feedback signal 210B follow the operation pattern signal 211, that is, the operation of the motor 201 indicated by the position feedback signal 210A and the speed feedback signal 210B follows the operation indicated by the operation pattern signal 211. The motor controller 204 performs feedback control on the operation of the motor 201. The motor controller 204 is a servo amplifier. The motor controller 204 may be an inverter. In that case, the motor controller 204 does not perform feedback control on the operation of the motor 201.

The heater 220 is attached to the machining head 207. The workpiece 208 is thus subjected to heating as well as pressing. The heating operation of the heater 220 is controlled by a heater controller 221.

Vibration phenomena that can occur in the machine 200 of FIG. 2 will now be described. Vibration phenomena include oscillation, residual vibration, and mechanical shock vibration.

The oscillation or so-called hunting which is a first vibration phenomenon is caused by the feedback control performed by the motor controller 204 on the operation of the motor 201 on the basis of the output of the encoder 202. A cause of the oscillation exemplary includes an unstable feedback loop. A characteristic of the first vibration phenomenon is a high frequency of the vibration which can be recognized as sound. Another characteristic is that the vibration does not continue. Yet another characteristic is that the vibration occurs even when the operation of the motor 201 is stopped.

The residual vibration which is a second vibration phenomenon is caused by a low mechanical rigidity of the machining head 207. The machining head 207 shakes after the machining head 207 stops following deceleration operation in a positioning operation of the machining head 207. A characteristic of the second vibration phenomenon is a low frequency of the vibration which cannot be recognized as sound.

The mechanical shock vibration which is a third vibration phenomenon is caused by operating the motor 201 with a command based on the operation pattern signal 211. The mechanical shock vibration occurs when an acceleration time or a deceleration time of the machining head 207 is indicated to be short or equal to zero by a command based on the operation pattern signal 211 in the positioning operation of the machining head 207, for example. A characteristic of the third vibration phenomenon is the generation of a "thud" sound at the moment when the motor 201 starts to move. Another characteristic is that the vibration and sound are generated only at the moment when the motor 201 starts to move and do not continue.

A user with abundant knowledge and experience on the machine 200, the motor 201, and the motor controller 204 can diagnose the vibration phenomenon on site and take correct measures corresponding to the vibration phenomenon. On the other hand, a user with less knowledge and experience on the machine 200, the motor 201, and the motor controller 204 cannot diagnose the vibration phenomenon on site and finds it difficult to take correct measures corresponding to the vibration phenomenon.

Figure 5:
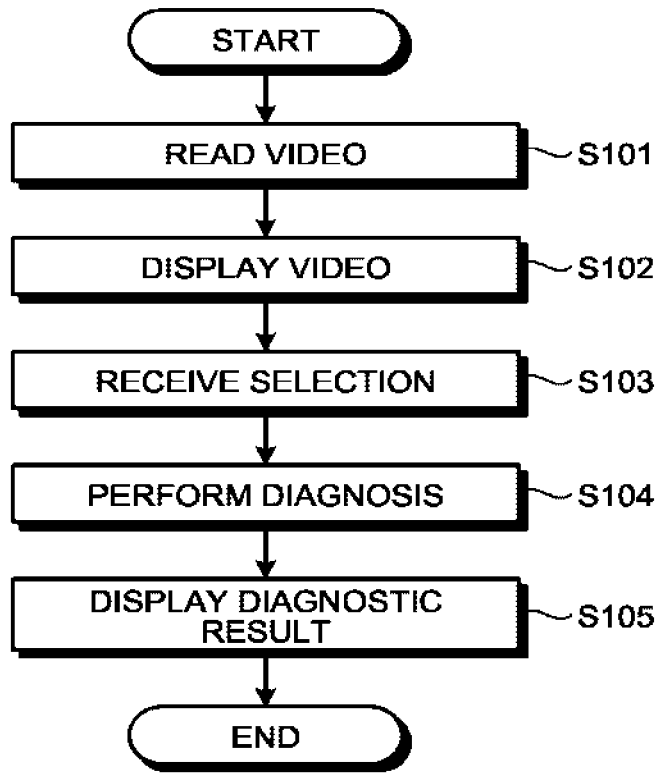
FIG. 5 is a flowchart of diagnostic processing executed by the diagnostic apparatus in FIG. 1.

The diagnostic apparatus 100 according to the first embodiment of the present invention executes diagnostic processing in FIG. 5 described later to be able to accurately diagnose the vibration phenomenon of the machine 200 that uses the motor 201 as the drive source. Thus, the user with less knowledge and experience on the machine 200, the motor 201, and the motor controller 204 can accurately diagnose the vibration phenomenon of the machine 200 on site using the diagnostic apparatus 100 and take correct measures corresponding to the vibration phenomenon.

The diagnostic apparatus 100 in FIG. 1 will now be described. The diagnostic apparatus 100 includes a storage unit 101. The storage unit 101 stores a name of the first vibration phenomenon, a video of the first vibration phenomenon, the cause of the first vibration phenomenon, and a measure against the first vibration phenomenon in association with one another. The storage unit 101 further stores a name of the second vibration phenomenon, a video of the second vibration phenomenon, the cause of the second vibration phenomenon, and a measure against the second vibration phenomenon in association with one another. The storage unit 101 stores still further stores a name of the third vibration phenomenon, a video of the third vibration phenomenon, the cause of the third vibration phenomenon, and a measure against the third vibration phenomenon in association with one another. The measure is information indicating an instruction made from the diagnostic apparatus 100 to the user 10 for preventing a vibration phenomenon. The name of the vibration phenomenon, the video of the vibration phenomenon, and the measure against the vibration phenomenon are examples of information on a vibration phenomenon.

The diagnostic apparatus 100 includes a video reading unit 102 that reads the video of the first vibration phenomenon, the video of the second vibration phenomenon, and the video of the third vibration phenomenon from the storage unit 101.

The diagnostic apparatus 100 includes a video display unit 103 that displays each of the video of the first vibration phenomenon, the video of the second vibration phenomenon, and the video of the third vibration phenomenon that are read by the video reading unit 102. The user 10 can view each of the video of the first vibration phenomenon, the video of the second vibration phenomenon, and the video of the third vibration phenomenon that are displayed by the video display unit 103.

The diagnostic apparatus 100 includes a phenomenon selection unit 104 that receives, from the user 10, selection of a video of a vibration phenomenon similar to a vibration phenomenon of the machine 200 from among the video of the first vibration phenomenon, the video of the second vibration phenomenon, and the video of the third vibration phenomenon.

The diagnostic apparatus 100 includes a diagnosis unit 105 that diagnoses the vibration phenomenon of the machine 200 on the basis of a selection result received by the phenomenon selection unit 104. The diagnosis unit 105 reads, from the storage unit 101, the name of any one of the first vibration phenomenon, the second vibration phenomenon, and the third vibration phenomenon stored in association with the video corresponding to the selection result received by the phenomenon selection unit 104, and outputs the read name of the vibration phenomenon as a diagnostic result. The diagnosis unit 105 may read, from the storage unit 101, the cause of any one of the first vibration phenomenon, the second vibration phenomenon, and the third vibration phenomenon stored in association with the video corresponding to the selection result received by the phenomenon selection unit 104, and output the read cause of the vibration phenomenon as a diagnostic result. The diagnosis unit 105 may read, from the storage unit 101, the measure against any one of the first vibration phenomenon, the second vibration phenomenon, and the third vibration phenomenon stored in association with the video corresponding to the selection result received by the phenomenon selection unit 104, and output the read measure against the vibration phenomenon as a diagnostic result. The diagnosis unit 105 may similarly output, as a diagnostic result, a combination of the name of the vibration phenomenon, the cause of the vibration phenomenon, and the measure against the vibration phenomenon that are read similarly.

The diagnostic apparatus 100 includes a diagnostic result display unit 106 that displays the diagnostic result output by the diagnosis unit 105. The diagnostic result display unit 106 displays the name of any one of the first vibration phenomenon, the second vibration phenomenon, and the third vibration phenomenon read by the diagnosis unit 105. The diagnostic result display unit 106 may display the cause of any one of the first vibration phenomenon, the second vibration phenomenon, and the third vibration phenomenon read by the diagnosis unit 105. The diagnostic result display unit 106 may display the measure against any one of the first vibration phenomenon, the second vibration phenomenon, and the third vibration phenomenon read by the diagnosis unit 105. The diagnostic result display unit 106 may display a combination of the name of the vibration phenomenon, the cause of the vibration phenomenon, and the measure against the vibration phenomenon that are read by the diagnosis unit 105. The user 10 can visually identify the name of any one of the first vibration phenomenon, the second vibration phenomenon, and the third vibration phenomenon; the cause of any one of the first vibration phenomenon, the second vibration phenomenon, and the third vibration phenomenon; or the measure against any one of the first vibration phenomenon, the second vibration phenomenon, and the third vibration phenomenon displayed by the diagnostic result display unit 106.

Next, a method of shooting the video, the cause, and the measure for each of the first vibration phenomenon, the second vibration phenomenon, and the third vibration phenomenon will be described.

Figure 3:
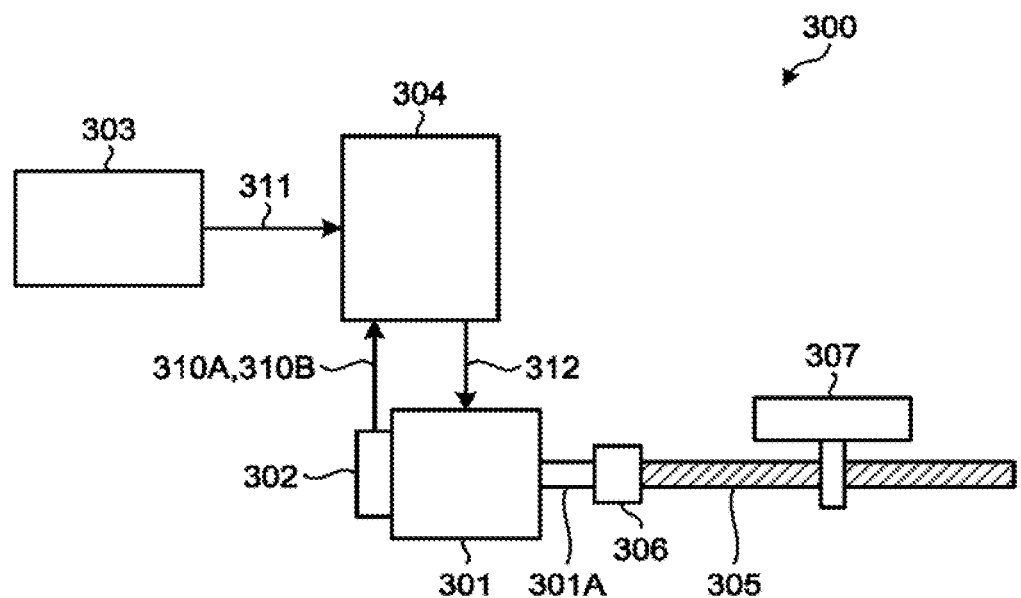
FIG. 3 is a diagram schematically illustrating an example of a machine that shoots each of a video of a first vibration phenomenon, a video of a second vibration phenomenon, and a video of a third vibration phenomenon.

FIG. 3 is a diagram schematically illustrating an example of a machine 300 that shoots each of the video of the first vibration phenomenon, the video of the second vibration phenomenon, and the video of the third vibration phenomenon. The machine 300 in FIG. 3 is similar in structure to the machine 200 in FIG. 2. The machine 300 may be similar in structure to the machine 200 and need not be identical in structure to the machine 200. This is because the machine 300 similar in structure to the machine 200 experiences a vibration phenomenon similar to a vibration phenomenon occurring in the machine 200. The machine 300 transmits driving force of a motor 301 to a table 307 via a ball screw 305 which is a mechanical part, and moves the table 307.

As illustrated in FIG. 3, the motor 301 is driven by a current 312 supplied from a motor controller 304 and serves as a drive source to move the table 307. The table 307 is a mechanical load driven by the motor 301.

An encoder 302 attached to the motor 301 detects rotational position and speed of the motor 301 to output the rotational position detected as a position feedback signal 310A and the rotational speed detected as a speed feedback signal 310B. The ball screw 305 for converting rotational motion of the motor 301 into translational motion is provided to a rotary shaft 301A of the motor 301. The motor 301 and the ball screw 305 are coupled by a coupling 306. The table 307 is joined to the ball screw 305 and moves left and right in the drawing.

A command generator 303 generates an operation pattern signal 311 indicating an operation pattern of the motor 301 and outputs the signal to the motor controller 304 driving the motor 301. The operation pattern signal 311 includes a position command value or a speed command value. The position command value is information indicating the position of the table 307 that is a movable part at a given time. The speed command value is information indicating the travel speed of the table 307 at a given time.

The motor controller 304 supplies the current 312 to the motor 301 such that the position feedback signal 310A and the speed feedback signal 310B follow the operation pattern signal 311, that is, the operation of the motor 301 indicated by the position feedback signal 310A and the speed feedback signal 310B follows the operation indicated by the operation pattern signal 311. The motor controller 304 performs feedback control on the operation of the motor 301.

The video of the first vibration phenomenon, the video of the second vibration phenomenon, and the video of the third vibration phenomenon stored in the storage unit 101 of the diagnostic apparatus 100 in FIG. 1 are each shot by generating a vibration phenomenon in the machine 300.

The video of the first vibration phenomenon is shot in a state in which the gain of the feedback loop is set higher than usual when the motor controller 304 performs feedback control on the motor 301 in the machine 300. The gain is a factor for determining the magnitude of the current 312. As a result, the feedback loop becomes unstable to cause a vibration phenomenon in the machine 300. What is occurring at this time is shot by an imaging apparatus such as a video camera. The video being shot contains image data and sound data of the machine 300 in which the vibration phenomenon is occurring. A characteristic of the video being shot is a high frequency of the vibration which can be recognized as sound. Another characteristic is that the vibration continues. Yet another characteristic is that the vibration occurs even when the operation of the motor 301 is stopped.

The video of the second vibration phenomenon is shot in a state in which the mechanical rigidity of the table 307 is reduced by connecting the ball screw 305 and the table 307 via a member susceptible to elastic deformation such as a thin plate member in the machine 300. As a result, the table 307 shakes after the table 307 stops following deceleration operation in a positioning operation of the table 307. What is occurring at this time is shot by an imaging apparatus such as a video camera. A characteristic of the video being shot is a low frequency of the vibration which cannot be recognized as sound.

The video of the third vibration phenomenon is shot in a state in which the acceleration time or deceleration time of the table 307 is set shorter than usual or equal to zero by a command in accordance with the operation pattern signal 311 in the positioning operation of the table 307 of the machine 300. What is occurring at this time is shot by an imaging apparatus such as a video camera. A characteristic of the video being shot is the generation of a "thud" sound at the moment when the motor 301 starts to move. The vibration and sound are generated only at the moment when the motor 301 starts to move and do not continue.

The cause of the first vibration phenomenon includes the unstable feedback loop as described above. The cause of the second vibration phenomenon includes the low mechanical rigidity as described above. The cause of the third vibration phenomenon includes the reduced acceleration time or deceleration time as described above.

The measure against the first vibration phenomenon includes readjustment of the gain or filter in the feedback loop. The measure against the second vibration phenomenon includes the use of a notch filter for removing the frequency of the residual vibration as the filter of the operation pattern signal. The measure against the third vibration phenomenon includes readjustment of the acceleration time or deceleration time.

Figure 4:
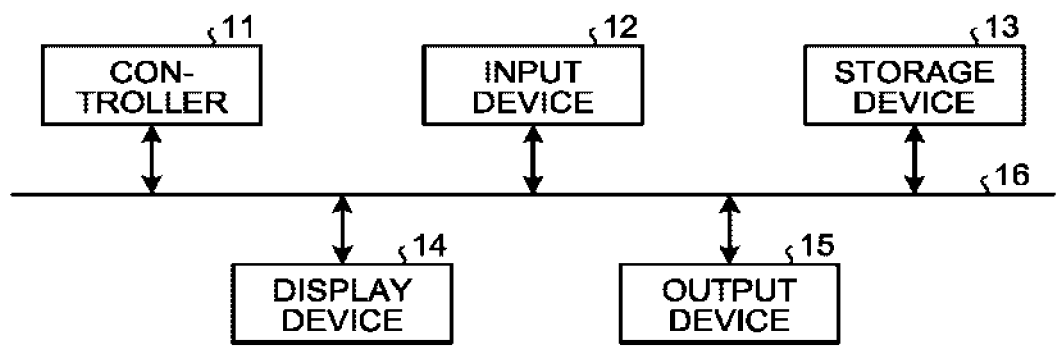
FIG. 4 is a diagram illustrating an example of the configuration of the diagnostic apparatus according to the present first embodiment.

The diagnostic apparatus 100 is specifically a computer system, that is, a computer. The computer system functions as the diagnostic apparatus 100 when a diagnostic program for implementing the diagnostic processing to be described later is run on the computer system. FIG. 4 is a diagram illustrating an example of the configuration of the diagnostic apparatus according to the present embodiment. As illustrated in FIG. 4, the computer system includes a controller 11, an input device 12, a storage device 13, a display device 14, and an output device 15, which are connected via a system bus 16.

The controller 11 is a central processing unit (CPU), for example, and executes the diagnostic program of the present embodiment. The input device 12 includes a keyboard and a mouse, for example, and is used by a user of the computer system to input various information. The storage device 13 includes various memories such as a random access memory (RAM) and a read only memory (ROM) as well as a storage device such as a hard disk, and stores a program to be executed by the controller 11, necessary data obtained in the course of processing, and the like. The storage device 13 is also used as a temporary storage area for the program. The display device 14 includes a liquid crystal display (LCD) panel or the like, and displays various screens to the user of the computer system. Note that FIG. 4 illustrates an example and does not limit the configuration of the computer system thereto. For example, the computer system may include a communication device that performs communication processing.

Here, an example of the operation of the computer system that renders the diagnostic program of the present embodiment executable will be described. The diagnostic program is installed to the storage device 13 of the computer system having the above configuration from, for example, a Compact Disc (CD)-ROM or a Digital Versatile Disc (DVD)-ROM set in a CD-ROM or DVD-ROM drive (not illustrated). When executed, the diagnostic program read from the storage device 13 is stored in a predetermined location of the storage device 13. In this state, the controller 11 executes the diagnostic processing of the present embodiment according to the program stored in the storage 13.

Note that although the present embodiment provides the program describing the diagnostic processing in the CD-ROM or DVD-ROM as a recording medium, the program may be provided for use through a transmission medium such as the Internet via the communication device, for example, depending on the configuration of the computer system, the capacity of the program provided, and the like.

The video reading unit 102, the video display unit 103, the phenomenon selection unit 104, the diagnosis unit 105, and the diagnostic result display unit 106 illustrated in FIG. 1 are realized using the controller 11 of FIG. 4. The phenomenon selection unit 104 of FIG. 1 is realized further using the input device 12 of FIG. 4. The storage unit 101 of FIG. 1 is a part of the storage device 13 of FIG. 4. The video display unit 103 and the diagnostic result display unit 106 of FIG. 1 are realized further using the display device 14 of FIG. 4. The diagnostic result display unit 106 of FIG. 1 is realized further using the output device 15 of FIG. 4.

Next, the diagnostic processing executed by the diagnostic apparatus 100 in FIG. 1 will be described. FIG. 5 is a flowchart of the diagnostic processing executed by the diagnostic apparatus 100 in FIG. 1. As illustrated in FIG. 6, the storage unit 101 of the diagnostic apparatus 100 stores the video of the first vibration phenomenon, the name of the first vibration phenomenon, the cause of the first vibration phenomenon, and the measure against the first vibration phenomenon in association with one another. Likewise, the storage unit 101 of the diagnostic apparatus 100 stores the video of the second vibration phenomenon, the name of the second vibration phenomenon, the cause of the second vibration phenomenon, and the measure against the second vibration phenomenon in association with one another. Likewise, the storage unit 101 of the diagnostic apparatus 100 stores the video of the third vibration phenomenon, the name of the third vibration phenomenon, the cause of the third vibration phenomenon, and the measure against the third vibration phenomenon in association with one another. The storage unit 101 of the diagnostic apparatus 100 stores the information on the three kinds of vibration phenomena in the first embodiment, but may store information on another vibration phenomenon. That is, the storage unit 101 of the diagnostic apparatus 100 may store a video of the other vibration phenomenon, a name of the other vibration phenomenon, a cause of the other vibration phenomenon, and a measure against the other vibration phenomenon in association with one another.

First, the video reading unit 102 of the diagnostic apparatus 100 reads the video of the first vibration phenomenon, the video of the second vibration phenomenon, and the video of the third vibration phenomenon from the storage unit 101 (step S101).

The video display unit 103 of the diagnostic apparatus 100 then displays each of the video of the first vibration phenomenon, the video of the second vibration phenomenon, and the video of the third vibration phenomenon being read by the video reading unit 102 (step S102). FIG. 7 is a diagram for explaining an example of the video display unit 103 and the phenomenon selection unit 104 of the diagnostic apparatus 100 in FIG. 1. A play button 111 in FIG. 7 is a button for playing the video of the first vibration phenomenon. When the user 10 selects the play button 111, the video display unit 103 of the diagnostic apparatus 100 displays the video of the first vibration phenomenon read by the video reading unit 102 in a window 121. As a result, the video of the first vibration phenomenon is played in the window 121. A play button 112 is a button for playing the video of the second vibration phenomenon. When the user 10 selects the play button 112, the video of the second vibration phenomenon is played in a window 122. A play button 113 is a button for playing the video of the third vibration phenomenon. When the user 10 selects the play button 113, the video of the third vibration phenomenon is played in a window 123.

Next, the phenomenon selection unit 104 of the diagnostic apparatus 100 receives selection of a video of a vibration phenomenon similar to a vibration phenomenon of the machine 200, the selection being made by the user 10 viewing the video of the first vibration phenomenon, the video of the second vibration phenomenon, and the video of the third vibration phenomenon that are displayed by the video display unit 103 (step S103). A radio button 131 in FIG. 7 is a button for selecting the video of the first vibration phenomenon. A radio button 132 is a button for selecting the video of the second vibration phenomenon. A radio button 133 is a button for selecting the video of the third vibration phenomenon. The user 10 can select the video of the vibration phenomenon similar to the vibration phenomenon of the machine 200 by selecting one of the radio buttons 131, 132, and 133.

The diagnosis unit 105 of the diagnostic apparatus 100 then diagnoses the vibration phenomenon of the machine 200 on the basis of a selection result received by the phenomenon selection unit 104 (step S104). The diagnosis unit 105 reads, from the storage unit 101, the name of any one of the first vibration phenomenon, the second vibration phenomenon, and the third vibration phenomenon stored in association with the video of the vibration phenomenon which is the selection result received by the phenomenon selection unit 104. The diagnosis unit 105 may read, from the storage unit 101, the cause of any one of the first vibration phenomenon, the second vibration phenomenon, and the third vibration phenomenon stored in association with the video of the vibration phenomenon which is the selection result received by the phenomenon selection unit 104. The diagnosis unit 105 may read, from the storage unit 101, the measure against any one of the first vibration phenomenon, the second vibration phenomenon, and the third vibration phenomenon stored in association with the video of the vibration phenomenon which is the selection result received by the phenomenon selection unit 104.

Next, the diagnostic result display unit 106 of the diagnostic apparatus 100 displays a diagnostic result made by the diagnosis unit 105 (step S105). The diagnostic result display unit 106 displays the name of any one of the first vibration phenomenon, the second vibration phenomenon, and the third vibration phenomenon read by the diagnosis unit 105. The diagnostic result display unit 106 may display the cause of any one of the first vibration phenomenon, the second vibration phenomenon, and the third vibration phenomenon read by the diagnosis unit 105. The diagnostic result display unit 106 may display the measure against any one of the first vibration phenomenon, the second vibration phenomenon, and the third vibration phenomenon read by the diagnosis unit 105. The processing is then ended.

The diagnostic processing of the first embodiment receives selection of the video of the vibration phenomenon similar to the vibration phenomenon of the machine 200 by the user 10 viewing the video of the first vibration phenomenon, the video of the second vibration phenomenon, and the video of the third vibration phenomenon, thereby diagnosing the vibration phenomenon of the machine 200 and displaying the diagnostic result. That is, the user is provided with means for intuitively comparing the vibration phenomenon played by the diagnostic apparatus 100 and the vibration phenomenon occurring in the machine 200. The user is further provided with the name, cause, or measure against each vibration phenomenon by the diagnostic apparatus 100. Thus, the user 10 with less knowledge and experience on the machine 200, the motor 201, and the motor controller 204 can accurately diagnose the vibration phenomenon of the machine 200 on site using the diagnostic apparatus 100 and take correct measures corresponding to the vibration phenomenon.

The first embodiment stores the unstable feedback loop as the cause and the readjustment of the gain or filter in the feedback loop as the measure in association with the oscillation which is the first vibration phenomenon, but the cause and measure are not limited thereto. The first embodiment may store aging of a mechanical part as the cause and review or replacement of the mechanical part as the measure in association with the first vibration phenomenon.

Second Embodiment

Figure 8:
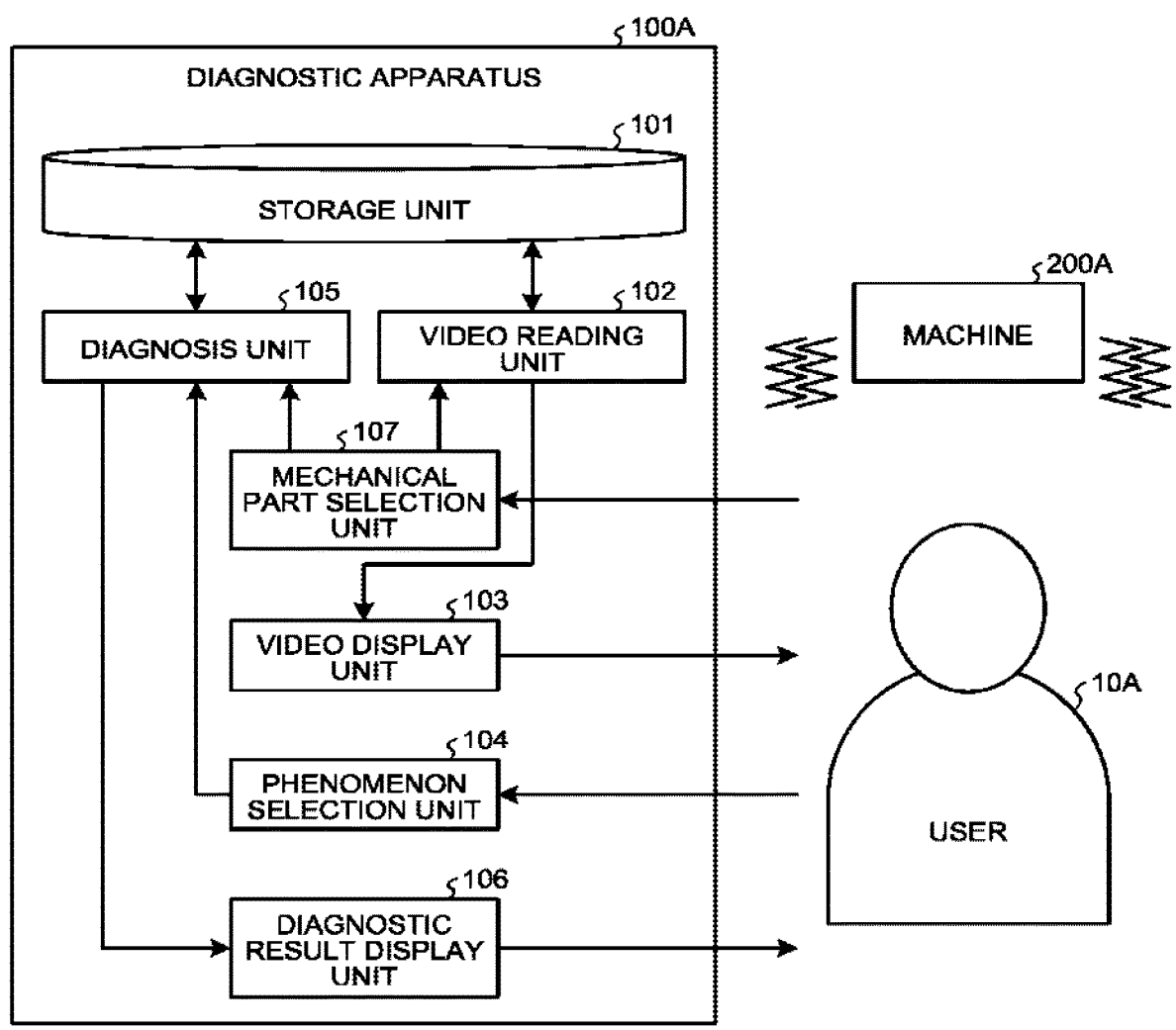
FIG. 8 is a diagram illustrating an example of a functional configuration of a diagnostic apparatus according to a second embodiment of the present invention.

Next, a diagnostic apparatus according to a second embodiment of the present invention will be described. FIG. 8 is a diagram illustrating an example of a functional configuration of a diagnostic apparatus according to the second embodiment of the present invention. A diagnostic apparatus 100A according to the second embodiment of the present invention is different from the diagnostic apparatus of the first embodiment in that a mechanical part selection unit 107 is included. Configurations and functions different from the configurations and functions of the first embodiment will be described while omitting description of configurations and functions that overlap with the configurations and functions of the first embodiment.

Figure 9:
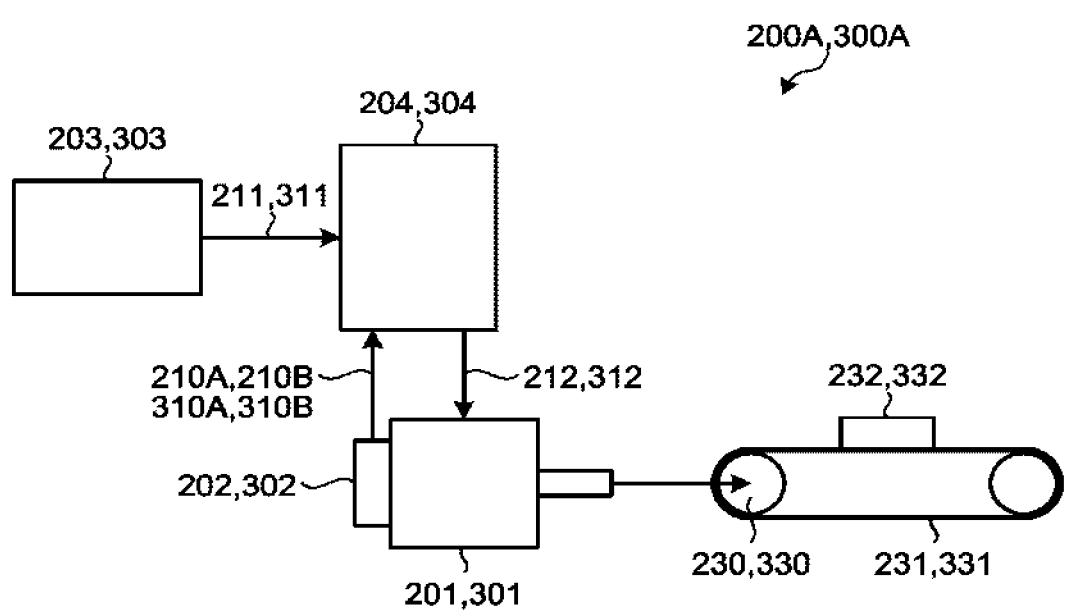
FIG. 9 is a diagram schematically illustrating an example of a machine that shoots each of a video of a fourth vibration phenomenon, a video of a fifth vibration phenomenon, and a video of a sixth vibration phenomenon according to the second embodiment.

A machine 200A in FIG. 8 will be described first. FIG. 9 is a diagram schematically illustrating an example of the machine 200A in FIG. 8. The machine 200A in FIG. 9 uses a timing belt 231 which is a mechanical part. The machine 200A transmits driving force of the motor 201 to a timing pulley 230 to operate the timing belt 231 and cause a head 232 to undergo translational motion.

The motor 201 is driven by the current 212 supplied from the motor controller 204 and serves as a drive source to cause the head 232 to undergo translational motion. The head 232 is a mechanical load driven by the motor 201.

An encoder 202 attached to the motor 201 detects rotational position and speed of the motor 201 to output the rotational position detected as a position feedback signal 210A and the rotational speed detected as a speed feedback signal 210B. The timing pulley 230 is connected to the motor 201. The timing pulley 230 rotates when the motor 201 rotates. Teeth (not illustrated) are provided on each of the timing pulley 230 and the timing belt 231. The teeth of the timing pulley 230 mesh with the teeth of the timing belt 231, whereby the rotational force of the timing pulley 230 is transmitted to the timing belt 231. As a result, the timing belt 231 is operated to cause the head 232 to undergo translational motion.

A command generator 203 generates an operation pattern signal 211 indicating an operation pattern of the motor 201 and outputs the signal to the motor controller 204 driving the motor 201. The operation pattern signal 211 includes a position command value or a speed command value. The position command value is information indicating the position of the head 232 as a movable part at a given time. The speed command value is information indicating the travel speed of the head 232 at a given time.

The motor controller 204 supplies the current 212 to the motor 201 such that the position feedback signal 210A and the speed feedback signal 210B follow the operation pattern signal 211, that is, the operation of the motor 201 indicated by the position feedback signal 210A and the speed feedback signal 210B follows the operation indicated by the operation pattern signal 211. The motor controller 204 performs feedback control on the operation of the motor 201.

Next, vibration phenomena that can occur in the machine 200A of FIG. 9 will be described. Vibration phenomena include oscillation, mechanical shock vibration, and synchronous vibration.

The oscillation or so-called hunting which is a fourth vibration phenomenon is caused by the feedback control performed by the motor controller 204 on the operation of the motor 201 on the basis of the output of the encoder 202. A cause of the fourth vibration phenomenon includes an unstable feedback loop. A characteristic of the fourth vibration phenomenon is a high frequency of the vibration which can be recognized as sound. Another characteristic is that the vibration does not continue. Yet another characteristic is that the vibration occurs even when the operation of the motor 201 is stopped. The mechanical resonance frequency of the timing belt 231 typically tends to be lower than the mechanical resonance frequency of the ball screw 205. Thus, the frequency of the vibration when oscillation occurs in the timing belt 231 is lower than the frequency of the vibration when oscillation occurs in the ball screw 205. The fourth vibration phenomenon thus has lower frequency and lower sound than those of the first vibration phenomenon.

The mechanical shock vibration which is a fifth vibration phenomenon is caused by operating the motor 201 with a command based on the operation pattern signal 211. The mechanical shock vibration occurs when, for example, an acceleration time or a deceleration time of the head 232 is indicated to be short or equal to zero by a command based on the operation pattern signal 211, in the positioning operation of the head 232. A characteristic of the fifth vibration phenomenon is the generation of a "thud" sound at the moment when the motor 201 starts to move. The vibration and sound are generated only at the moment when the motor 201 starts to move and do not continue.

The synchronous vibration which is a sixth vibration phenomenon is caused by collision between the teeth of the timing pulley 230 and the teeth of the timing belt 231. A characteristic of the sixth vibration phenomenon is that, as the rotational speed of the motor 201 increases, the collision between the teeth of the timing pulley 230 and the teeth of the timing belt 231 occurs more frequently to cause an increase in the frequency of the vibration. Another characteristic of the sixth vibration phenomenon is that, as the rotational speed of the motor 201 decreases, the collision between the teeth of the timing pulley 230 and the teeth of the timing belt 231 occurs less frequently to cause a decrease in the frequency of the vibration.

The diagnostic apparatus 100A according to the second embodiment of the present invention executes diagnostic processing in FIG. 10 described later to be able to flexibly and accurately diagnose the vibration phenomenon of the machine 200A that uses the motor 201 as the drive source. Thus, a user with less knowledge and experience on the machine 200A, the motor 201, and the motor controller 204 can flexibly and accurately diagnose the vibration phenomenon of the machine 200A on site using the diagnostic apparatus 100A and take correct measures corresponding to the vibration phenomenon.

Next, the diagnostic apparatus 100A in FIG. 8 will be described. The diagnostic apparatus 100A in FIG. 8 includes the mechanical part selection unit 107 that receives, from a user 10A, selection of a mechanical part identical or similar to a mechanical part used in the machine 200A from among a plurality of mechanical parts such as the ball screw, the timing belt, a rack and pinion, and a rotary table.

The storage unit 101 stores a name of a mechanical part, a name of a vibration phenomenon, a video of the vibration phenomenon, a cause of the vibration phenomenon, and a measure against the vibration phenomenon in association with one another. The name of the vibration phenomenon, the video of the vibration phenomenon, and the measure against the vibration phenomenon are examples of information on a vibration phenomenon. The video reading unit 102 reads, from the storage unit 101, a video of a vibration phenomenon stored in association with the mechanical part which is a selection result received by the mechanical part selection unit 107. The video display unit 103 displays the video of the vibration phenomenon read by the video reading unit 102. The phenomenon selection unit 104 receives, from the user 10A, selection of a video of a vibration phenomenon similar to a vibration phenomenon of the machine 200A.

The diagnosis unit 105 diagnoses the vibration phenomenon of the machine 200A on the basis of a selection result received by the phenomenon selection unit 104. The diagnosis unit 105 reads, from the storage unit 101, a name of the vibration phenomenon stored in association with the video of the vibration phenomenon which is the selection result received by the phenomenon selection unit 104. The diagnosis unit 105 may read, from the storage unit 101, a cause of the vibration phenomenon stored in association with the video of the vibration phenomenon which is the selection result received by the phenomenon selection unit 104. The diagnosis unit 105 may read, from the storage unit 101, a measure against the vibration phenomenon stored in association with the video of the vibration phenomenon which is the selection result received by the phenomenon selection unit 104. The diagnosis unit 105 may diagnose the vibration phenomenon of the machine 200A on the basis of the selection result received by the phenomenon selection unit 104 and the selection result received by the mechanical part selection unit 107. The diagnostic result display unit 106 displays a diagnostic result output by the diagnosis unit 105. The diagnostic result display unit 106 displays the name of the vibration phenomenon read by the diagnosis unit 105. The diagnostic result display unit 106 may display the cause of the vibration phenomenon read by the diagnosis unit 105. The diagnostic result display unit 106 may display the measure against the vibration phenomenon read by the diagnosis unit 105.

Next, a method of shooting the video, the cause, and the measure for each of the fourth vibration phenomenon, the fifth vibration phenomenon, and the sixth vibration phenomenon will be described.

FIG. 9 is a diagram schematically illustrating an example of a machine 300A that shoots each of the video of the fourth vibration phenomenon, the video of the fifth vibration phenomenon, and the video of the sixth vibration phenomenon. Although the machine 300A has the same configuration as the machine 200A, the machine 300A need not have the same configuration as the machine 200A but may have a configuration similar to the configuration of the machine 200A. This is because the machine 300A similar in configuration to the machine 200A experiences a vibration phenomenon similar to a vibration phenomenon occurring in the machine 200A. The machine 300A has the same configuration as the machine 200A and thus will not be described.

The video of the fourth vibration phenomenon, the video of the fifth vibration phenomenon, and the video of the sixth vibration phenomenon stored in the storage unit 101 of the diagnostic apparatus 100A illustrated in FIG. 8 are each shot by generating vibration in the machine 300A.

The video of the fourth vibration phenomenon is shot in a state in which the gain of the feedback loop is set higher than usual when the motor controller 304 performs feedback control on the motor 301 in the machine 300A. As a result, the feedback loop becomes unstable to cause a vibration phenomenon in the machine 300A. What is occurring at this time is shot by an imaging apparatus such as a video camera. The video being shot contains image data and sound data of the machine 300A experiencing the vibration phenomenon. A characteristic of the video being shot is a high frequency of the vibration which can be recognized as sound. Another characteristic is that the vibration continues. Yet another characteristic is that the vibration occurs even when the operation of the motor 301 is stopped.

The video of the fifth vibration phenomenon is shot in a state in which the acceleration time or deceleration time of a head 332 is set shorter than usual or equal to zero by a command in accordance with the operation pattern signal 311 in the positioning operation of the head 332 of the machine 300A. What is occurring at this time is shot by an imaging apparatus such as a video camera. A characteristic of the video being shot is the generation of a "thud" sound at the moment when the motor 301 starts to move. The vibration and sound are generated only at the moment when the motor 301 starts to move and do not continue.

The video of the sixth vibration phenomenon is shot by gradually increasing and decreasing the rotational speed of the motor 301 in the machine 300A. What is occurring at this time is shot by an imaging apparatus such as a video camera. A characteristic of the video being shot is that, as the rotational speed of the motor 301 increases, collision between teeth of a timing pulley 330 and teeth of a timing belt 331 occurs more frequently to cause an increase in the frequency of the vibration. Another characteristic is that, as the rotational speed of the motor 301 decreases, the collision between the teeth of the timing pulley 330 and the teeth of the timing belt 331 occurs less frequently to cause a decrease in the frequency of the vibration.

The cause of the fourth vibration phenomenon includes the unstable feedback loop as described above. The cause of the fifth vibration phenomenon includes the reduced acceleration time or deceleration time as described above. The cause of the sixth vibration phenomenon includes the collision between the teeth as described above.

The measure against the fourth vibration phenomenon includes readjustment of the gain or filter in the feedback loop. The measure against the fifth vibration phenomenon includes readjustment of the acceleration time or deceleration time. The measure against the sixth vibration phenomenon includes the use of control for suppressing a disturbance such as a disturbance observer since the collision between the teeth acts as a disturbance for the motor.

Next, the diagnostic processing executed by the diagnostic apparatus 100A in FIG. 8 will be described. FIG. 10 is a flowchart of the diagnostic processing executed by the diagnostic apparatus 100A in FIG. 8.

As illustrated in FIG. 11, for example, the storage unit 101 of the diagnostic apparatus 100A stores "ball screw" as the name of the mechanical part, the video of the first vibration phenomenon, the name of the first vibration phenomenon, the cause of the first vibration phenomenon, and the measure against the first vibration phenomenon in association with one another. The storage unit 101 further stores "ball screw", the video of the second vibration phenomenon, the name of the second vibration phenomenon, the cause of the second vibration phenomenon, and the measure against the second vibration phenomenon in association with one another. The storage unit 101 further stores "ball screw", the video of the third vibration phenomenon, the name of the third vibration phenomenon, the cause of the third vibration phenomenon, and the measure against the third vibration phenomenon in associated with one another. Likewise, the storage unit 101 of the diagnostic apparatus 100A stores "timing belt" as the name of the mechanical part, the video of the fourth vibration phenomenon, the name of the fourth vibration phenomenon, the cause of the fourth vibration phenomenon, and the measure against the fourth vibration phenomenon in association with one another. The storage unit 101 further stores "timing belt", the video of the fifth vibration phenomenon, the name of the fifth vibration phenomenon, the cause of the fifth vibration phenomenon, and the measure against the fifth vibration phenomenon in association with one another. The storage unit 101 further stores "timing belt", the video of the sixth vibration phenomenon, the name of the sixth vibration phenomenon, the cause of the sixth vibration phenomenon, and the measure against the sixth vibration phenomenon in associated with one another.

In the second embodiment, the storage unit 101 of the diagnostic apparatus 100A stores the information on each of the three kinds of vibration phenomena of each of the two kinds of mechanical parts, but may store information on another vibration phenomenon of another mechanical part. That is, as illustrated in FIG. 11, for example, the storage unit 101 of the diagnostic apparatus 100A may store "rack and pinion" as a name of another mechanical part, a video of another vibration phenomenon, a name of the other vibration phenomenon, a cause of the other vibration phenomenon, and a measure against the other vibration phenomenon in association with one another.

Figure 12:
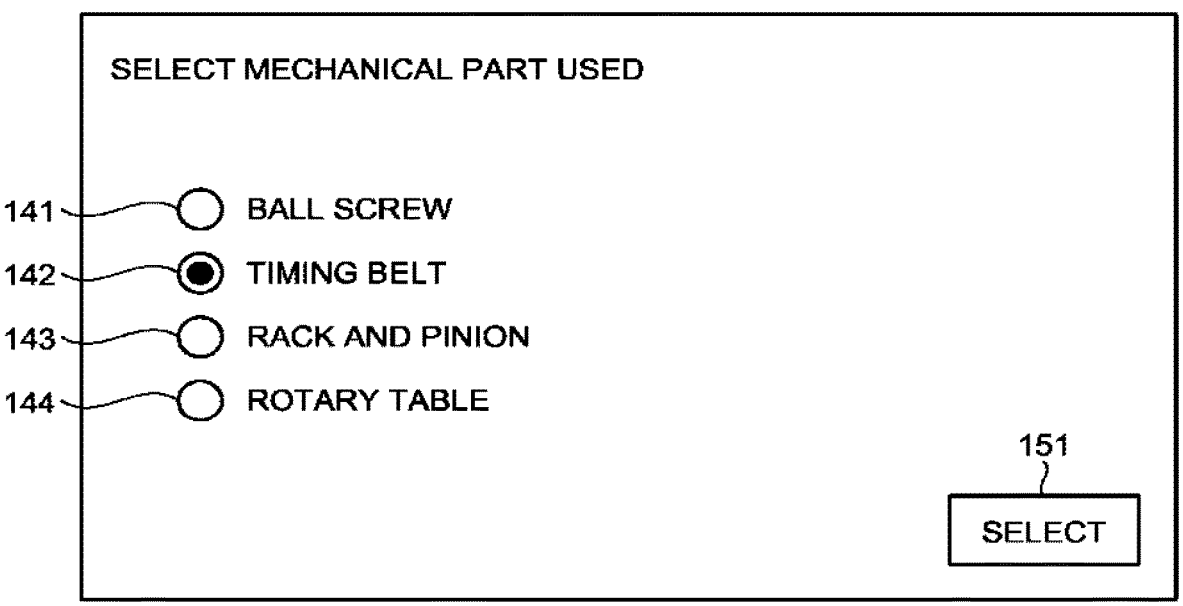
FIG. 12 is a diagram for explaining an example of a mechanical part selection unit of the diagnostic apparatus in FIG. 8.

First, the mechanical part selection unit 107 of the diagnostic apparatus 100A receives, from the user 10A, selection of a mechanical part identical or similar to a mechanical part used in the machine 200A from among the plurality of mechanical parts such as the ball screw, the timing belt, the rack and pinion, and the rotary table (step S201). FIG. 12 is a diagram for explaining an example of the mechanical part selection unit 107 of the diagnostic apparatus 100A. A radio button 141 in FIG. 12 is a button for selecting the ball screw. A radio button 142 is a button for selecting the timing belt. A radio button 143 is a button for selecting the rack and pinion. A radio button 144 is a button for selecting the rotary table. The user 10A can select the mechanical part identical or similar to the mechanical part used in the machine 200A by selecting any one of the radio buttons 141, 142, 143, and 144 and pressing a selection button 151. The mechanical parts are indicated by words in FIG. 12 but may be indicated by illustrations or photographs so that the user 10A can select the mechanical part easily.

Next, the video reading unit 102 of the diagnostic apparatus 100A reads, from the storage unit 101, a video of a vibration phenomenon stored in association with the mechanical part which is a selection result received by the mechanical part selection unit 107 (step S202). When the selection result received by the mechanical part selection unit 107 is the timing belt, for example, the video reading unit 102 reads each of the video of the fourth vibration phenomenon, the video of the fifth vibration phenomenon, and the video of the sixth vibration phenomenon from the storage unit 101.

The video display unit 103 of the diagnostic apparatus 100A then displays the video of the vibration phenomenon read by the video reading unit 102 (step S203).

Next, the phenomenon selection unit 104 of the diagnostic apparatus 100A receives, from the user 10A, selection of a video of a vibration phenomenon similar to a vibration phenomenon of the machine 200A (step S204).

The diagnosis unit 105 of the diagnostic apparatus 100A then diagnoses the vibration phenomenon of the machine 200A on the basis of a selection result received by the phenomenon selection unit 104 (step S205). The diagnosis unit 105 reads, from the storage unit 101, a name of the vibration phenomenon stored in association with the video corresponding to the selection result received by the phenomenon selection unit 104. The diagnosis unit 105 may read, from the storage unit 101, a cause of the vibration phenomenon stored in association with the video corresponding to the selection result received by the phenomenon selection unit 104. The diagnosis unit 105 may read, from the storage unit 101, a measure against the vibration phenomenon stored in association with the video corresponding to the selection result received by the phenomenon selection unit 104. The diagnosis unit 105 of the diagnostic apparatus 100A may diagnose the vibration phenomenon of the machine 200A on the basis of the selection result received by the phenomenon selection unit 104 and the selection result received by the mechanical part selection unit 107.

Next, the diagnostic result display unit 106 of the diagnostic apparatus 100A displays a diagnostic result made by the diagnosis unit 105 (step S206). The diagnostic result display unit 106 displays the name of the vibration phenomenon read by the diagnosis unit 105. The diagnostic result display unit 106 may display the cause of the vibration phenomenon read by the diagnosis unit 105. The diagnostic result display unit 106 may display the measure against the vibration phenomenon read by the diagnosis unit 105. The processing is then ended.

Figure 10:
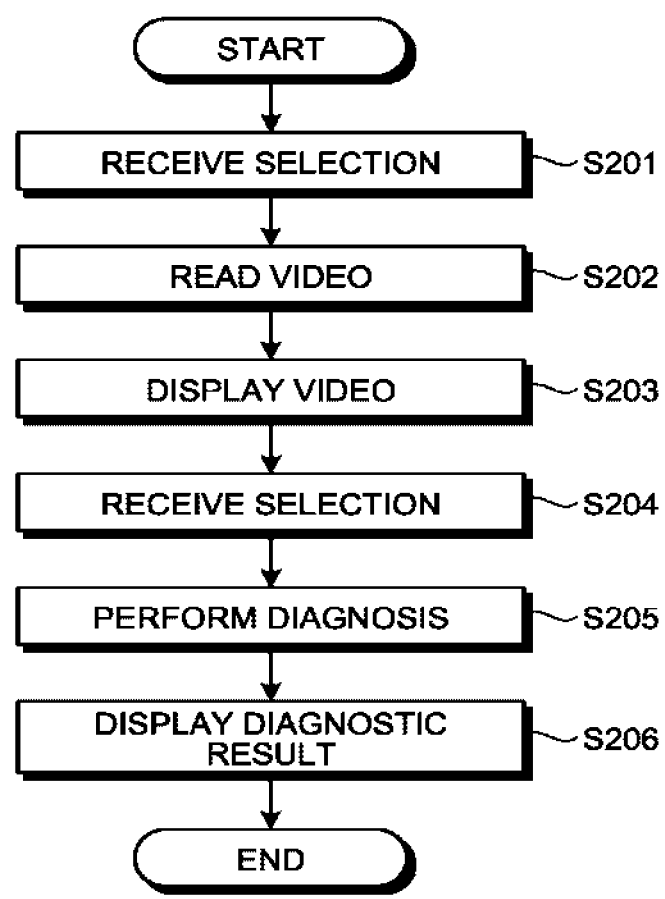
FIG. 10 is a flowchart of diagnostic processing executed by the diagnostic apparatus in FIG. 8.

The diagnostic processing illustrated in FIG. 10 of the second embodiment receives, from the user 10A, the selection of the mechanical part identical or similar to the mechanical part used in the machine 200A and displays the videos of the vibration phenomena. Then, the selection of the video of the vibration phenomenon similar to the vibration phenomenon of the machine 200A is received from the user 10A viewing the videos of the vibration phenomena, whereby the vibration phenomenon of the machine 200A is diagnosed and the diagnostic result is displayed. Thus, the user 10A with less knowledge and experience on the machine 200A, the motor 201, and the motor controller 204 can flexibly and accurately diagnose the vibration phenomenon of the machine 200A on site using the diagnostic apparatus 100A and take correct measures corresponding to the vibration phenomenon.

Moreover, the diagnostic processing illustrated in FIG. 10 receives, from the user 10A, the selection of the mechanical part identical or similar to the mechanical part used in the machine 200A and displays the videos of the vibration phenomena. The videos of the vibration phenomena viewed by the user 10A are thus limited to videos of vibration phenomena that are likely to occur when the mechanical part used in the machine 200A is used in a machine. Therefore, in addition to obtaining the effect similar to the effect of the first embodiment, the second embodiment can reduce the time required for diagnosing the vibration phenomenon of the machine 200A by allowing the user 10A to view a video of an appropriate candidate from among many videos of vibration phenomena.

Third Embodiment

Figure 13:
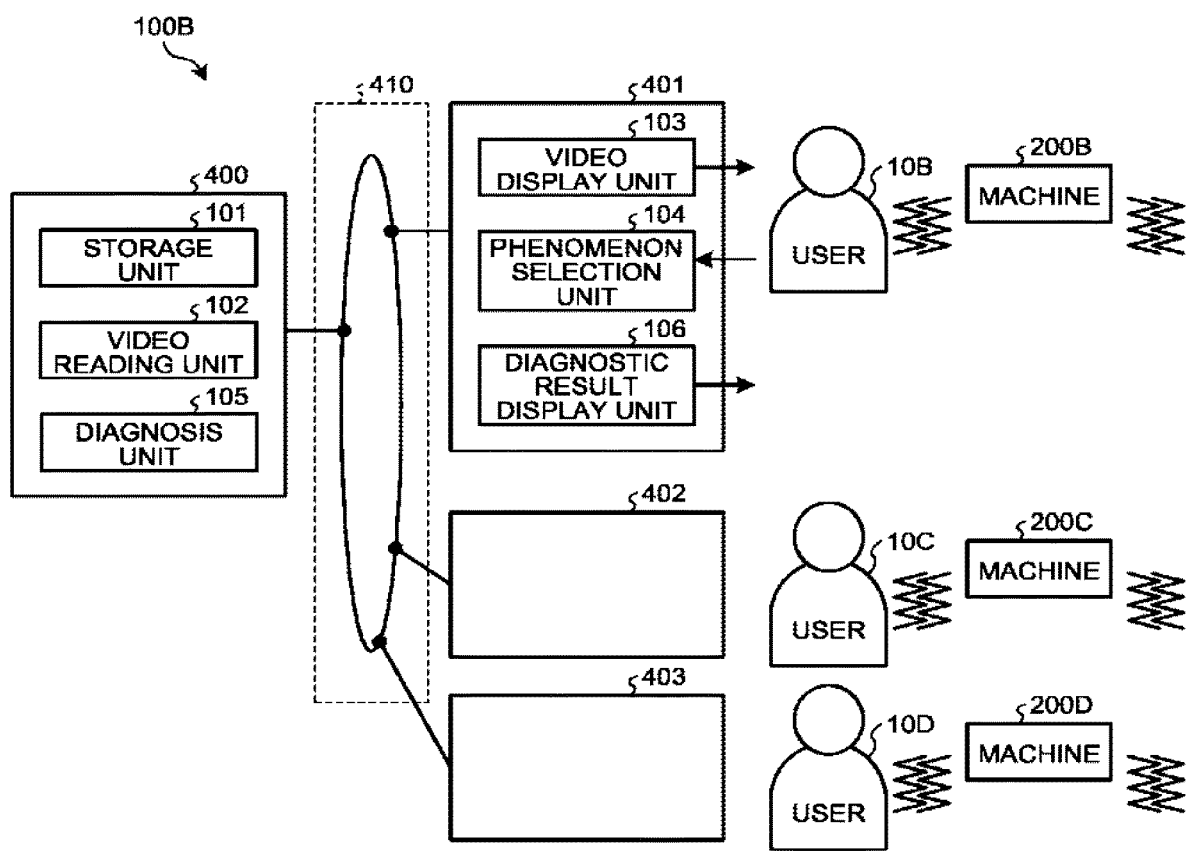
FIG. 13 is a diagram illustrating an example of a functional configuration of a diagnostic system according to a third embodiment of the present invention.

Next, a diagnostic system according to a third embodiment of the present invention will be described. FIG. 13 is a diagram illustrating an example of a functional configuration of a diagnostic system according to the third embodiment of the present invention. A diagnostic system 100E according to the third embodiment of the present invention is different from the first or second embodiment in that the system is implemented by a server 400, a client 401, and a network 410, for example. Configurations and functions different from the configurations and functions of the first or second embodiment will be described while omitting description of configurations and functions overlapping with the configurations and functions of the first or second embodiment.

In FIG. 13, the server 400 is connected to the network 410. The server 400 includes the storage unit 101 and the video reading unit 102. The server 400 includes the diagnosis unit 105 that diagnoses a vibration phenomenon of a machine 200B on the basis of a selection result transmitted from the client 401 via the network 410 and received by the phenomenon selection unit 104 of the client 401. Here, the network 410 is specifically the Internet or an intranet, for example, but may be any computer network.

The client 401 is connected to the network 410. The client 401 includes the video display unit 103 that displays each of a video of the first vibration phenomenon, a video of the second vibration phenomenon, and a video of the third vibration phenomenon being transmitted from the server 400 via the network 410 and read by the video reading unit 102 of the server 400. The client 401 includes the phenomenon selection unit 104 that receives, from a user 10D, selection of a video of a vibration phenomenon similar to a vibration phenomenon of the machine 200B from among the video of the first vibration phenomenon, the video of the second vibration phenomenon, and the video of the third vibration phenomenon. The client 401 includes the diagnostic result display unit 106 that displays a diagnostic result output by the diagnosis unit 105 of the server 400 and transmitted from the server 400 via the network 410. The user 10B can diagnose the vibration phenomenon of the machine 200B using the client 401 included in the diagnostic system 100B.

Each of the server 400 and the client 401 is specifically a computer system, that is, a computer. An example of the configuration of each of the server 400 and the client 401 is one that includes a communication unit in the example of configuration illustrated in FIG. 4, and thus will not be described. Clients 402 and 403 each have similar configuration and function to the configuration and function of the client 401, and thus will not be described. The diagnostic system 100B is also implemented by the server 400, the client 402, and the network 410 as well as by the server 400, the client 403, and the network 410. A user 10C can recognize a vibration phenomenon of a machine 200C using the client 402 included in the diagnostic system 100B. A user 10D can recognize a vibration phenomenon of a machine 200B using the client 403 included in the diagnostic system 100D.

The diagnostic system 100B according to the third embodiment can obtain the effect similar to the effect of the first embodiment. Moreover, in the diagnostic system 100B, the plurality of users 10B, 10C, and 108 can diagnose the corresponding machines 200D, 200C, and 2000 at the same time. The diagnostic system 100B according to the third embodiment does not require the storage unit 101 in the clients 401, 402, and 403 so that the clients 401, 402, and 403 can be configured at low cost. As a result, the diagnostic system 100B can be configured at low cost.

The clients 401, 402, and 403 of the diagnostic system 100E may each include the mechanical part selection unit 107 of the second embodiment. This allows the diagnostic system to obtain the effect similar to the effect of the second embodiment.

Fourth Embodiment

Next, a diagnostic apparatus and a diagnostic system according to a fourth embodiment of the present invention will be described. The configurations of the diagnostic apparatus and the diagnostic system according to the fourth embodiment of the present invention are similar to those of the diagnostic apparatus according to the first and second embodiments and the diagnostic system according to the third embodiment, whereby configurations and functions different from the configurations and functions of the first to third embodiments will be described while omitting description of configurations and functions overlapping with the configurations and functions of the first to third embodiments.

In the first to third embodiments, the storage unit 101 stores the videos of the vibration phenomena. In the present embodiment, the storage unit 101 stores a video of a state in which the command generator and the motor controller are operated by a user (hereinafter referred to as an "operational state of the controller") and a vibration phenomenon caused by the operation (hereinafter simply referred to as a "vibration phenomenon" in the present embodiment). In the first to third embodiments, the user compares the vibration phenomenon played by the diagnostic apparatus with the vibration phenomenon occurring in the machine, and selects the video of the vibration phenomenon similar to the vibration phenomenon occurring in the machine. In the present embodiment, the user compares the operational state of the controller played by the diagnostic apparatus with an operational state of an actual controller, and also compares the vibration phenomenon played by the diagnostic apparatus with a vibration phenomenon occurring in a machine, thereby selecting a video of a vibration phenomenon similar to the vibration phenomenon occurring in the machine. The present embodiment provides additional information to the user in selecting the video of the vibration phenomenon similar to the vibration phenomenon occurring in the machine. The operational state of the controller is useful as the additional information for the user in selecting the video of the vibration phenomenon similar to the vibration phenomenon occurring in the machine. The video of the operational state of the controller and the vibration phenomenon is made by continuously shooting the operational state of the controller and the vibration phenomenon. The video reading unit 102 reads the video of the operational state of the controller and the vibration phenomenon from the storage unit 101. The video display unit 103 displays the video of the operational state of the controller and the vibration phenomenon read by the video reading unit 102.

In the present embodiment, the operational state of the controller and the vibration phenomenon may be shot separately to be made into separate videos. The storage unit 101 may separately store a video of the operational state of the controller and a video of the vibration phenomenon. The video of the operational state of the controller is made by shooting a spatial region including the command generator and motor controller as well as the user who operates the command generator and motor controller. In this case, the video reading unit 102 reads each of the video of the operational state of the controller and the video of the vibration phenomenon from the storage unit 101. The video display unit 103 displays each of the video of the operational state of the controller and the video of the vibration phenomenon read by the video reading unit 102. For example, the video display unit 103 displays the video of the operational state of the controller and then the video of the vibration phenomenon. Alternatively, for example, the video display unit 103 may divide a display screen into two to display the video of the operational state of the controller on one side and the video of the vibration phenomenon on another side. Yet alternatively, for example, the video display unit 103 may display the video of the vibration phenomenon on a display screen and the video of the operational state of the controller on a small window in the display screen.

In the present embodiment, the operational state of the controller and the vibration phenomenon may be shot separately and synchronously in time and made into separate videos. In this case, the video display unit 103 preferably displays the video of the operational state of the controller and the video of the vibration phenomenon synchronously in time. Displaying synchronously in time means to simultaneously display scenes that are shot at the same time in two videos.

Next, a method of shooting the video of the operational state of the controller and the vibration phenomenon will be described.

Figure 14:
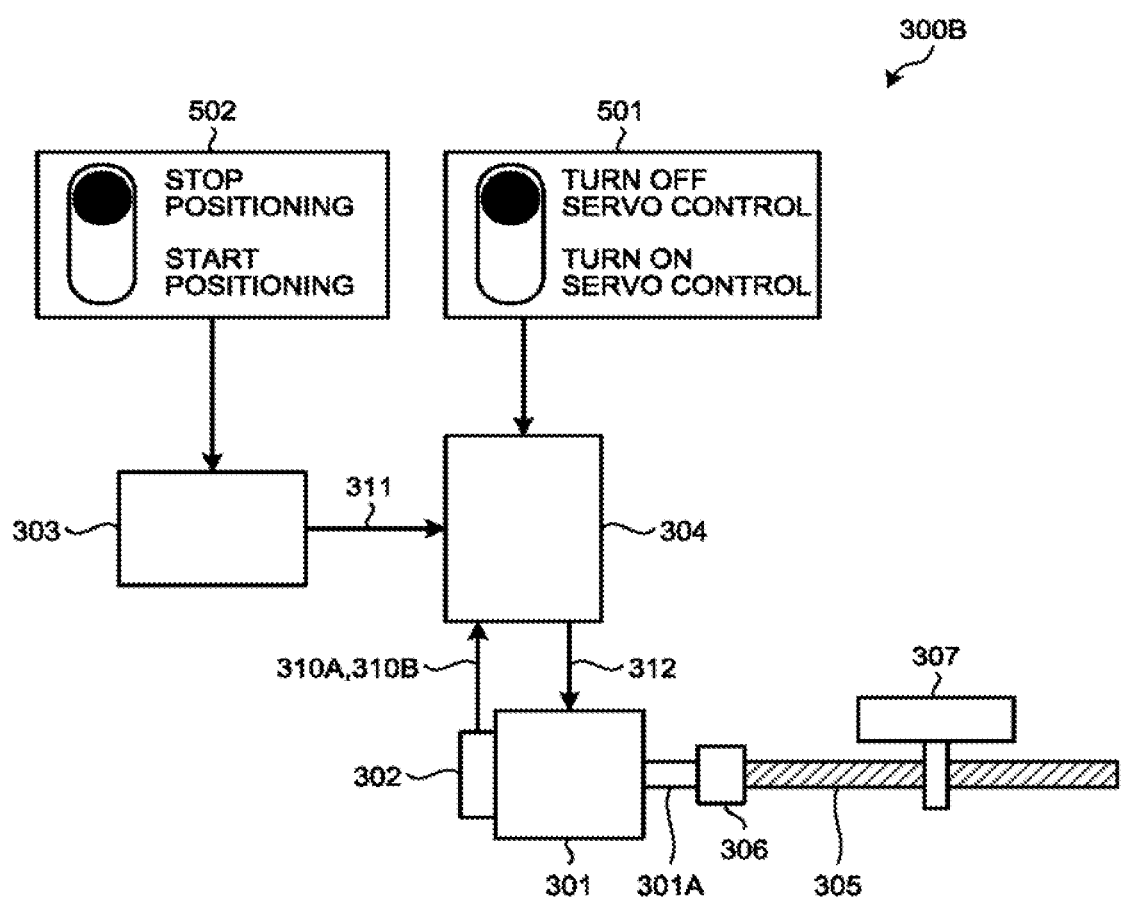
FIG. 14 is a diagram schematically illustrating an example of a machine for shooting a video of an operational state of a controller and a vibration phenomenon, according to a fourth embodiment.

FIG. 14 is a diagram schematically illustrating an example of a machine 300B for shooting the video of the operational state of the controller and the vibration phenomenon, according to the fourth embodiment. The machine 300B is different from the machine 300 of FIG. 3 in that switches 501 and 502 are included. Configurations and functions different from the configurations and functions of the machine 300 will be described while omitting description of configurations and functions that overlap with the configurations and functions of the machine 300.

The switch 501 is a switch for turning ON (that is, starting) or turning OFF (that is, stopping) servo control by the motor controller 304. When a user operates the switch 501 to start the servo control by the motor controller 304, the motor controller 304 supplies the current 312 to the motor 301 and controls the rotation of the motor 301 by feedback control. When the user operates the switch 501 to stop the servo control by the motor controller 304, the motor controller 304 stops supplying the current 312 to the motor 301 and stops feedback control.

The switch 502 is a switch for starting the positioning operation of the table 307, that is, turning ON the output of the operation pattern signal 311 by the command generator 303, or stopping the positioning operation of the table 307, that is, turning OFF the output of the operation pattern signal 311 by the command generator 303.

Vibration phenomena include oscillation, residual vibration, and mechanical shock vibration. As described above, the first vibration phenomenon corresponds to oscillation, the second vibration phenomenon corresponds to residual vibration, and the third vibration phenomenon corresponds to mechanical shock vibration.

A video of the operational state of the controller and the first vibration phenomenon is made by shooting a state in which the user operates the switch 501 and a state of the machine 300B immediately thereafter. The video illustrates how vibration occurs in the machine 300B immediately after the servo control by the motor controller 304 is switched from OFF to ON by the user's operation on the switch 501. The vibration occurs because the first vibration phenomenon is caused by an unstable feedback loop as described above and thus occurs immediately after the servo control is turned ON.

A video of the operational state of the controller and the second vibration phenomenon is made by shooting a state in which the user operates the switch 501, a state of the machine 300B after the switch 501 is operated, a state in which the user operates the switch 502 after operating the switch 501, and a state of the machine 300E after the switch 502 is operated. The video illustrates how vibration does not occur in the machine 300B after the servo control by the motor controller 304 is switched from OFF to ON by the user's operation on the switch 501, and how vibration occurs in the machine 300B after the output of the operation pattern signal 311 by the command generator 303 is turned ON by the user's operation on the switch 502. The vibration occurs because the second vibration phenomenon is caused by the low mechanical rigidity of a mechanical load as described above and thus occurs when the positioning operation of the mechanical load is performed.

A video of the operational state of the controller and the third vibration phenomenon is made by shooting a state in which the user operates the switch 501, a state of the machine 300B after the switch 501 is operated, a state in which the user operates the switch 502 after operating the switch 501, and a state of the machine 300E after the switch 502 is operated. The video illustrates how vibration does not occur in the machine 300B after the servo control by the motor controller 304 is switched from OFF to ON by the user's operation on the switch 501, and how vibration occurs in the machine 300B after the output of the operation pattern signal 311 by the command generator 303 is turned ON by the user's operation on the switch 502. The vibration occurs because the third vibration phenomenon is caused by operating the motor with a command in accordance with the operation pattern signal as described above, and thus occurs when the acceleration time or deceleration time of a mechanical load is indicated to be short or equal to zero in a command based on the operation pattern signal in the positioning operation of the mechanical load.

Typically, a vibration phenomenon occurs in a machine as a result of a user performing some operation on the controller. According to the present embodiment, the user can view the video of the operational state of the controller and the vibration phenomenon, thereby being able to recognize the causal relationship that the first vibration phenomenon occurs immediately after the servo control is turned ON, and the causal relationship that the second vibration phenomenon and the third vibration phenomenon do not occur immediately after the servo control is turned ON but occur when the positioning operation of the mechanical load is performed. This allows the user to more easily associate a vibration phenomenon encountered on site with the vibration phenomenon appearing in the video. As a result, the user can more accurately select a video of a vibration phenomenon similar to the vibration phenomenon of the machine and more accurately diagnose the vibration phenomenon of the machine on site.

In the present embodiment, the motor controller 304 is, for example, a servo amplifier or a servo driver that supplies power to a servo motor when the servo motor serves as the motor 301. The command generator 303 is a device such as a programmable logic controller (PLC), a motion controller, or a positioning unit that issues a control command to the servo amplifier via various control networks or issues a control command to the servo amplifier by an input/output (I/O) signal or a pulse train. The video of the operational state of the controller described above may be made by shooting a display screen of engineering software that operates such devices or shooting an input device such as a switch or button connected to such devices. The command generator 303 and the motor controller 304 are not limited to the above but may be any device that directly or indirectly issues various control commands to the motor 301.

The configuration illustrated in the above embodiment merely illustrates an example of the content of the present invention, and can thus be combined with another known technique or partially omitted or modified without departing from the scope of the present invention.

REFERENCE SIGNS LIST

10, 10A, 10D, 10C, 10D user; 11 control unit; 12 input unit; 13, 101 storage unit; 14 display unit; 15 output unit; 100, 100A diagnostic apparatus; 100B diagnostic system; 102 video reading unit; 103 video display unit; 104 phenomenon selection unit; 105 diagnosis unit; 106 diagnostic result display unit; 107 mechanical part selection unit; 200, 200A, 200B, 200C, 200D, 300, 300A, 300B machine; 201, 301 motor; 201A rotary shaft; 202, 302 encoder; 203, 303 command generator; 204, 304 motor controller; 205, 305 ball screw; 206, 306 coupling; 207 machining head; 208 workpiece; 209, 307 table; 210A, 310A position feedback signal; 2103, 310B speed feedback signal; 211, 311 operation pattern signal; 212, 312 current; 220 heater; 221 heater controller; 230, 330 timing pulley; 231, 331 timing belt; 232, 332 head; 400 server; 401, 402, 403 client; 410 network; 501, 502 switch.

The invention claimed is:

1. A diagnostic apparatus for diagnosing a vibration phenomenon occurring in a machine that uses a motor as a drive source, the apparatus comprising:
 a display device;
 an input device;
 a processor to execute a program; and
 a storage device to store information on a vibration phenomenon in association with a video of a vibration phenomenon for each of a plurality of kinds of vibration phenomena that can occur in the machine, and the program which, when executed by the processor, performs a step of,
 reading the video of each of the plurality of kinds of vibration phenomena from the storage device, and
 the display device displays the video of each of the plurality of kinds of vibration phenomena read,
 the input device receives a selection result indicating the video selected by a user from the video of each of the plurality of kinds of vibration phenomena, and
 the processor further reads, from the storage device, the information on a vibration phenomenon stored in association with the video corresponding to the selection result, and output the information on a vibration phenomenon that is read as a diagnostic result, and
 the display device displays the diagnostic result.

2. A diagnostic apparatus for diagnosing a vibration phenomenon occurring in a machine that uses a motor as a drive source, the apparatus comprising:
 a display device to receive a video of each of a plurality of kinds of vibration phenomena from a server via a network and display the video of each of the plurality of kinds of vibration phenomena, the server including a storage device that stores information on a vibration phenomenon in association with the video of a vibration phenomenon for each of the plurality of kinds of vibration phenomena that can occur in the machine, and
 an input device to receive a selection result indicating the video selected by a user from the video of each of the plurality of kinds of vibration phenomena, and wherein
 the display device receives the information on a vibration phenomenon stored in association with the video corresponding to the selection result from the server via the network, and display the information on a vibration phenomenon that is received as a diagnostic result.

3. The diagnostic apparatus according to claim 1, wherein the input device further receives a selection result indicating a mechanical part that is selected by the user from a plurality of kinds of mechanical parts,
 the storage device stores, for each of the plurality of kinds of mechanical parts that can be used in the machine, information on a vibration phenomenon in association with a video of a vibration phenomenon for each of a plurality of kinds of vibration phenomena that can occur in the machine using the mechanical part, and
 the processor reads, from the storage device, the video stored in association with the mechanical part corresponding to the selection result that is received by the input device.

4. The diagnostic apparatus according to claim 2, wherein the input device further receives a selection result indicating a mechanical part that is selected by the user from a plurality of kinds of mechanical parts, wherein
 the display device receives and displays a video stored in association with the mechanical part corresponding to the selection result that is received by the input device, the video being received via the network from the server including the storage device that stores, for each of the plurality of kinds of mechanical parts that can be used in the machine, information on a vibration phenomenon in association with the video of a vibration phenomenon for each of a plurality of kinds of vibration phenomena that can occur in the machine using the mechanical part.

5. The diagnostic apparatus according to claim 1, wherein the storage device stores the information on a vibration phenomenon of each of the plurality of kinds of vibration phenomena that can occur in the machine in association with the video of a state in which a controller controlling the motor is operated and a vibration phenomenon caused by the operation.

6. The diagnostic apparatus according to claim 5, wherein the display device displays the state in which the controller controlling the motor is operated and the vibration phenomenon caused by the operation synchronously in time.

7. The diagnostic apparatus according to claim 1, wherein the information on a vibration phenomenon includes at least one of a name of a vibration phenomenon, a cause of a vibration phenomenon, and a measure for preventing a vibration phenomenon.

8. A diagnostic system for diagnosing a vibration phenomenon occurring in a machine that uses a motor as a drive source, the system comprising:
a server connected to a network; and
a client connected to the network, wherein
the client includes:
a display device to display a video of a vibration phenomenon for each of a plurality of kinds of vibration phenomena that can occur in the machine, the video being transmitted from the server via the network;
an input device to receive a selection result indicating the video selected by a user from the video of each of the plurality of kinds of vibration phenomena, and wherein
the display device displays information on a vibration phenomenon that is a diagnostic result transmitted from the server via the network, and
the server includes:
a storage device to store the information on a vibration phenomenon in association with the video of a vibration phenomenon for each of the plurality of kinds of vibration phenomena, and
a processor to read the video of each of the plurality of kinds of vibration phenomena from the storage unit, and wherein
the processor reads, from the storage device, the information on a vibration phenomenon stored in association with the video corresponding to the selection result that is transmitted from the client via the network and received by the input device, and outputs the information on the vibration phenomenon that is read as a diagnostic result.

9. The diagnostic apparatus according to claim 2, wherein the storage device stores the information on a vibration phenomenon of each of the plurality of kinds of vibration phenomena that can occur in the machine in association with the video of a state in which a controller controlling the motor is operated and a vibration phenomenon caused by the operation.

10. The diagnostic apparatus according to claim 9, wherein the display device displays the state in which the controller controlling the motor is operated and the vibration phenomenon caused by the operation synchronously in time.

* * * * *